United States Patent [19]

Borner

[11] Patent Number: 5,444,937
[45] Date of Patent: Aug. 29, 1995

[54] CLIP PARTICULARLY FOR USE AS A SINKER

[76] Inventor: Jacques Borner, 17, Chemin des Billettes, 17220 Clavette, France

[21] Appl. No.: 220,919

[22] Filed: Mar. 31, 1994

[30] Foreign Application Priority Data

Mar. 31, 1993 [FR] France .................. 93 03729

[51] Int. Cl.$^6$ .............................. A01K 95/00
[52] U.S. Cl. ..................... 43/44.91; 43/44.95; 24/908
[58] Field of Search ............. 43/44.91, 44.95; 24/908, 555, 607, 3 J, 334, 327, 132 R

[56] References Cited

U.S. PATENT DOCUMENTS

| 3,645,419 | 2/1972 | Shorrock et al. ......... 43/44.91 X |
| 4,071,930 | 2/1978 | Tanaka ..................... 24/543 |
| 4,780,981 | 11/1988 | Hayward et al. ......... 43/44.91 X |

FOREIGN PATENT DOCUMENTS

| 323326 | 3/1903 | France . |
| 586204 | 3/1925 | France . |
| 2371141 | 7/1978 | France ............... 43/44.95 |

Primary Examiner—Mark Rosenbaum
Assistant Examiner—Jeanne M. Elpel
Attorney, Agent, or Firm—Young & Thompson

[57] ABSTRACT

A clip for use as a sinker for fishing, comprising two half-shells (1, 2) forming jaws having the shape of spherical sectors of the same diameter. The sector of at least one of the half-shells (1, 2) subtends an angle less than 180°. The half-shells (1, 2) are assembled with each other about a pivotal axis (D) forming a common diameter of the half-shells (1, 2) by a resilient blade (3) anchored on the half-shells (1, 2) at a point (8) on that diameter. The resilient blade (3) is so shaped as to exert a continuous gripping action maintaining the two half-shells (1, 2) in a closed position. The elastic blade (3) imparts to the half-shells (1, 2) two over-center positions in each of which confronting edges of the half-shells rest against each other. These two over-center positions are spaced apart by an intermediate position in which the resilient blade (3) and the pivotal axis (D) lie in a common plane. Thus, the half-shells tend to snap into either one of two equilibrium positions in which they are yieldably maintained by the resilient blade (3).

8 Claims, 2 Drawing Sheets

FIG.1
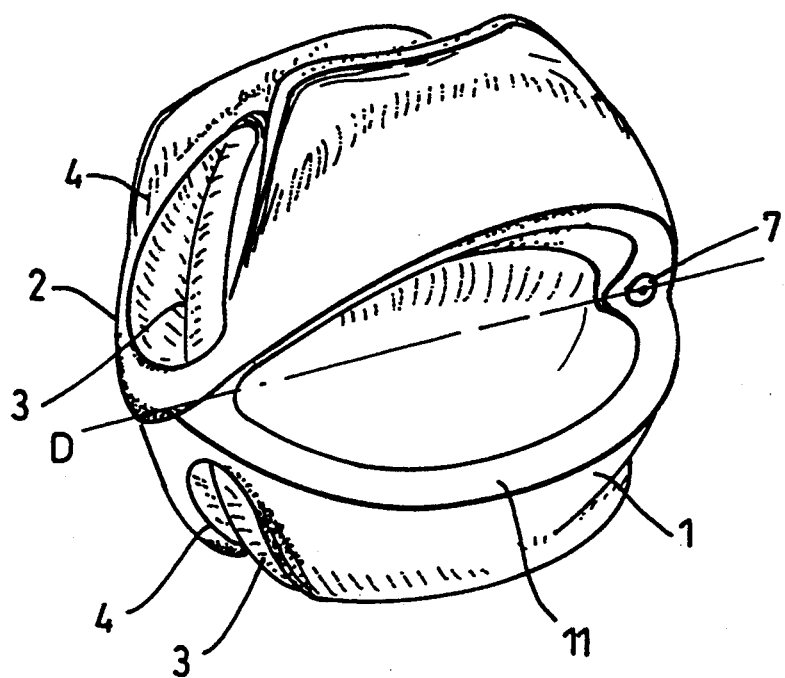
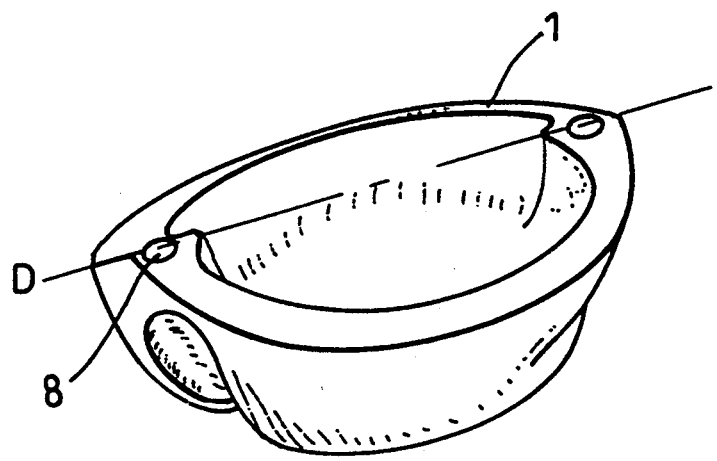
FIG.2

CLIP PARTICULARLY FOR USE AS A SINKER

FIELD OF THE INVENTION

The present invention relates to a clip particularly for use as a sinker for fishing.

BACKGROUND OF THE INVENTION

Weights for fishing lines adapted to be on a float line on which is mounted, at one end, a hook if desired associated with a bait or lure, are known. The weights are generally constituted by a pair of jaws of lead forming a shell of sufficient capacity to enclose a hook and if desired its bait. The jaws, in known sinkers, are generally articulated about themselves and are subjected permanently to the action of a resilient return member which maintains them closed. These jaws moreover comprise manipulating means in the form of a tongue or a handle. These line weights are particularly described in French patents FR-A-2.660.835 and FR-A-2.371.141. These sinkers are particularly cumbersome and often give rise to loss of the lower end of the line because of hooking of the sinker at the bottom of the body of water.

SUMMARY OF THE INVENTION

The object of the present invention is therefore to provide a clip, particularly for use as a sinker for fishing, which, on the one hand, is adapted to open by itself when it is wedged between two rocks or branches, and on the other hand is not cumbersome.

For this purpose, the invention relates to a clip particularly for use as a sinker for fishing, characterized in that it comprises two half-shells forming jaws in the shape of spherical sectors of the same diameter, the sector of at least one of the shells subtending an angle less than 180°, said shells being assembled with each other, about a pivotal axis forming a common diameter of said half-shells, by means of a resilient blade anchored on the two half-shells at a point on said diameter, said blade being so shaped as to exert a permanent gripping action maintaining the two half-shells in contact with their two semi-circular edges, this position corresponding to the closing of the clip.

According to a preferred embodiment of the invention, the ends of the resilient blade are freely mounted within recesses having the shape of slots whose opposite walls are disposed, in the position of swinging of the two half-shells, on opposite sides of a plane containing the pivotal axis and the free ends of the resilient blade such that, during passage of the half-shells from one end position to another corresponding to the closure position of the jaws in which the edges of the half-shells are disposed in contact over at least a portion of their length, the blade deforms and its ends pass from one side to the other of said plane to exert a gripping action on the edges of the shells before being maintained together.

BRIEF DESCRIPTION OF THE DRAWINGS

Other characteristics and advantages of the invention will become apparent from a reading of the description which follows and the accompanying drawings, in which:

FIG. 1 is a perspective view of a clip according to the invention;

FIG. 2 is a perspective view of one half-shell of the clip of FIG. 1; and

FIGS. 3-5 show front views of the clip passing from one closed position to another; and.

DETAILED DESCRIPTION OF THE INVENTION

Figure 3:
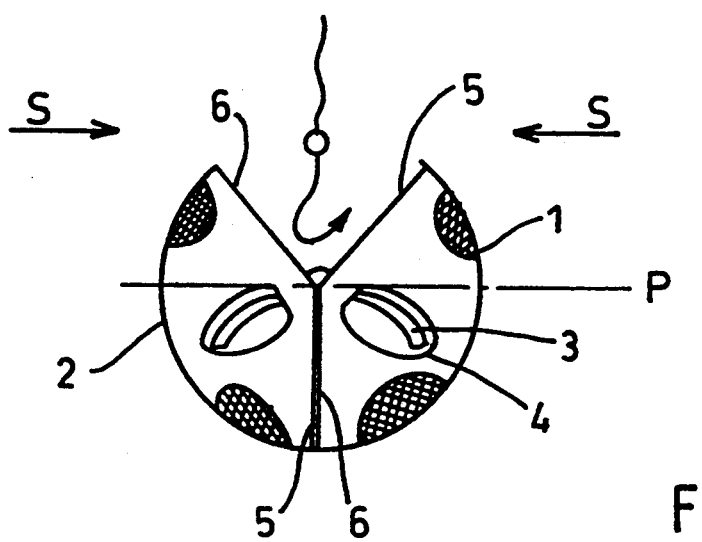
Figure 4:
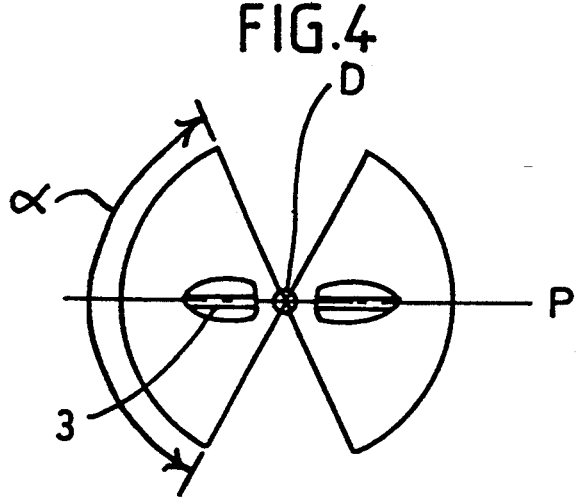
Figure 5:
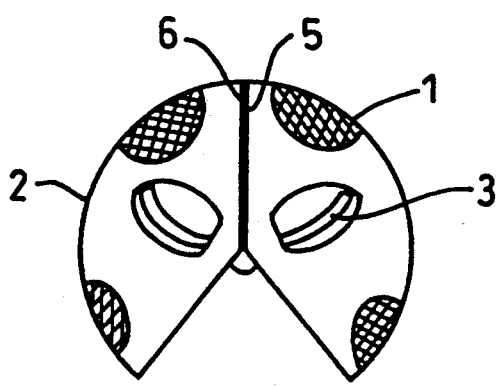

According to FIGS. 1 and 2, the clip which is the object of the invention is constituted by two half-shells 1 and 2. These half-shells can have a great number of shapes. They are generally in the form of spherical sectors with at least one of the shells, preferably both, subtending an angle $\alpha$ (FIG. 4) of the sector less than 180°. These half-shells are adapted to pivot about an axis D. This axis D is located at the point of meeting of the two end semi-planes of said half-shells as shown in FIG. 1 and constitutes therefore a diameter common to the two half-shells. These half-shells are maintained assembled by means of a resilient blade 3 which is anchored on the half-shells at a point 8 coinciding with one of the ends of the common diameter. A second point, designated 7 in FIG. 1, also corresponds to a point of meeting of the semi-planes, and constitutes a second articulation of said shells. Thanks to these two points of articulation, the shells can pivot about the axis D to occupy two end positions called closure positions in which the edges of the half-shells are disposed in contact over at least a portion of their length as shown in FIGS. 3 and 5 in which the edges 5 and 6 of the shells are disposed in contact with each other. Opposite the contacting edges, the shells provide on the contrary an opening permitting the introduction of the hook as shown in FIG. 3.

The resilient blade 3 which permits maintaining the shells assembled is constituted by a steel wire which fits about the two shells. It can also be provided that the resilient blade is disposed within the two shells or in a recess provided in the walls of the half-shells. In the example shown in FIG. 1, the resilient blade is disposed in ovoidal slots 4 disposed on the external surface of the half-shells. In this case, as shown in FIGS. 3-5, the free ends of the resilient blade 3 are adapted to move within the slots 4. These slots are provided such that in the intermediate position, also called the dead point, or over-center position of the half-shells, as shown in FIG. 4, the confronting walls of the slots will be disposed on opposite sides of a plane P containing the pivotal axis D and the free ends of the resilient blade. Because of this, during passage of the clip from the closed position shown in FIG. 3 to the closed position shown in FIG. 5, the free ends of the resilient blade disposed on one side of the plane P will pass through an intermediate unstable equilibrium position in which they are disposed in the same plane as the anchor point 8 of the resilient blade on the half-shells, before passing into a closed position in which the free ends of the resilient blade occupy a position disposed on the other side of the plane P. Thanks to this particular arrangement, the free ends of the resilient blade exert a continuous gripping action maintaining the shells in closed position. Because of this, to permit passage from one closed position to the other, it is necessary to exert a counter-force by pressing the half-shells in the direction of the arrows S shown in FIG. 3.

Figure 6:
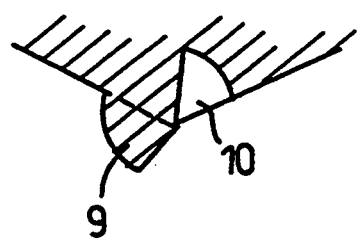
FIG. 6 is a cross-sectional view of a point of articulation of the clip according to the invention.

The second point of articulation 7 (FIG. 2) which facilitates the passage of the two half-shells from one closed position to another by pivoting, can have a large number of forms. Thus, by way of example, this second articulation point can be constituted by complementary male and female elements created by molding with said half-shells as shown in FIG. 6. In this case, the male element, disposed on each half-shell is, for example, a projection 9, such as a sector of a sphere adjacent the articulation edge and adapted to lodge within a recess portion or hollow 10 provided in the other half-shell, the recess portion constituting the female portion of the articulation. In another embodiment of the invention, the articulation can be formed of alternate male and female elements forming a hinge. This second point of articulation can also be constituted by hemispherical recesses disposed facing each half-shell, a sphere coming to rest within the interior of said recesses. Other embodiments can be provided. Similarly, the external shape of the shells can be variable. Thus, for aesthetic reasons or for saving material the half-shells need not be in contact but over a portion of the plane of the joint which can be reduced to a point disposed generally at 11 in FIG. 1. In this case, the edges of the half-shells are slightly concave.

This clip for use as a sinker for fishing has because of its design a large number of advantages. Thus, it is less cumbersome than conventional sinkers. Moreover, it is open in any position, which facilitates entry of water into the sinker. Finally, it is very easy to adjust the gripping force solely by modifying the resilient blade used.

What is claimed is:

1. A clip for use as a sinker for fishing, comprising two half-shells (1, 2) forming jaws having the shape of spherical sectors of the same diameter, the sector of at least one of the half-shells (1, 2) subtending an angle less than 180°, said half-shells (1, 2) being assembled with each other about a pivotal axis (D) forming a common diameter of said half-shells (1, 2) by a resilient blade (3) anchored on the half-shells (1, 2) at a point (8) on said diameter, said resilient blade (3) being so shaped as to exert a continuous gripping action maintaining the two half-shells (1, 2) in a closed position.

2. Clip according to claim 1, wherein the resilient blade (3) has ends which are freely mounted within recesses having the shape of slots (4) whose opposite walls are disposed, in a swinging position of the half-shells (1, 2) on opposite sides of a plane (P) containing the pivotal axis (D) and the ends of the resilient blade (3) such that, during passage of the half-shells (1, 2) from one end position to another, corresponding to closed positions of the half-shells (1, 2) in which edges of the half-shells (1, 2) are disposed in contact with each other over at least a portion of their length, the resilient blade (3) deforming and the ends passing from one side to the other of said plane (P) to exert a gripping action on the edges of the half-shells (1, 2) before being maintained in contact with each other.

3. Clip according to claim 2, wherein the slots (4) are ovoidal and provided on an external surface of said half-shells (1, 2).

4. Clip according to claim 2, comprising also on the pivotal axis (D) a second point of articulation (7) constituted by complementary male and female elements produced by molding with said half-shells.

5. Clip according to claim 4, wherein the male element disposed on each half-shell (1, 2) is protruding and constituted by a spherical sector disposed adjacent the articulation edge, said projection lodging in the interior of a hollowed section provided adjacent the articulation edge on the other half-shell (1, 2) and constituting the female portion of the articulation.

6. Clip according to claim 4, wherein the articulation is formed of alternate male and female elements.

7. Clip according to claim 1, further comprising on the pivotal axis (D) a second articulation point (7).

8. Clip according to claim 1, wherein said resilient blade (3) imparts to said half-shells (1, 2) two over-center positions in each of which confronting edges of said half-shells rest against each other, said two over-center positions being spaced apart by a position in which said resilient blade (3) and said pivotal axis (D) lie in a common plane.

* * * * *